UNITED STATES PATENT OFFICE.

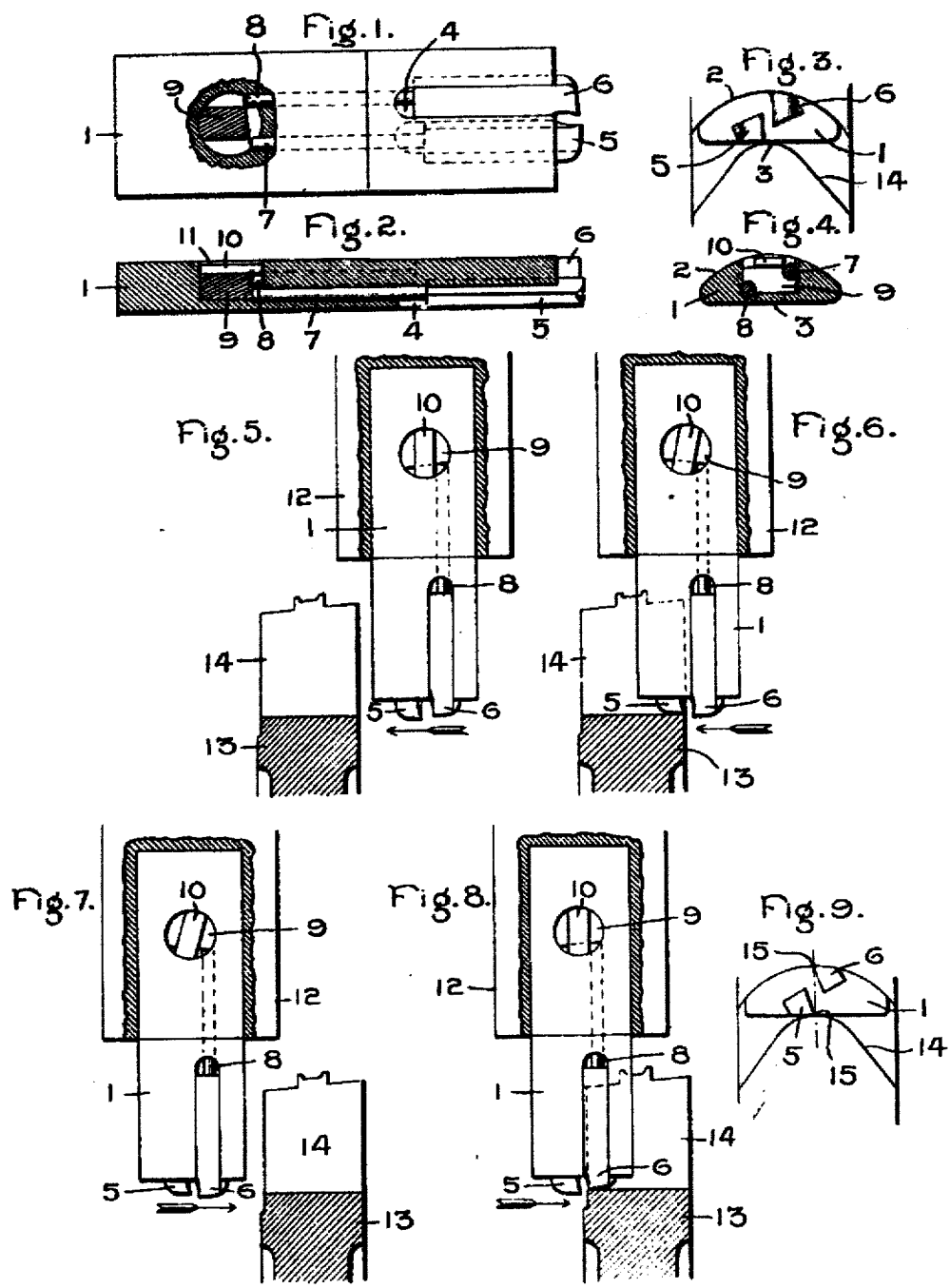

JOHN RIDDELL, OF SCHENECTADY, NEW YORK, ASSIGNOR TO GENERAL ELECTRIC COMPANY, A CORPORATION OF NEW YORK.

TOOL FOR CUTTING TURBINE-BUCKETS.

No. 873,089.

Specification of Letters Patent.

Patented Dec. 10, 1907.

Application filed January 18, 1904. Serial No. 189,414.

*To all whom it may concern:*

Be it known that I, JOHN RIDDELL, a citizen of the United States, residing at Schenectady, in the county of Schenectady and State of New York, have invented certain new and useful Improvements in Tools for Cutting Turbine-Buckets, of which the following is a specification.

The present invention relates to the tools employed to cut turbine vanes or buckets out of a blank of solid metal, and has for its object to produce a tool which will cut more linear inches of stock per hour than those now in use.

A further object is to provide a tool of such character that the bucket-cutting machine with which it is used can cut on the forward and also on the reverse stroke instead of in one direction only as is the present practice.

In carrying out the invention, two small cutters are provided and so arranged that one cuts while the tool as a whole is moved in one direction across the face of a disk, ring or segment thereof, while the other cuts when the tool is moved in the opposite direction. The cutters are mounted in a shank of special form. When viewed in cross-section one side of the shank is straight or slightly curved, while the opposite side is convexly curved or tapered with respect to the first to coincide, or approximately coincide, with the shape of the bucket being formed. The shank is considerably longer than it is wide, viewed in cross-section and measured in the direction of the cut, and tapers from a substantially central point toward the front and rear. The object in giving the shank this special formation is to permit the cutters to be kept normal to the cut or, in other words, to permit the tool-holder to turn about the center from which the curved surface of the bucket is struck. In this way, the cutting edge will be coincident with a radius at every point in its travel, and at the same time the shank will contain the maximum amount of stock. By this arrangement a very strong construction is provided, and one which is unyielding in the direction of the cut and will prevent the cutters from chattering. The cutters are made with angular surfaces to prevent turning and are mounted in oppositely disposed sockets formed in the sides of the shank. The outer faces of the cutters partake of the general shape of the shank so that the cut will be of maximum width for a given shank. The path of one cutter overlaps that of the other, and one cuts while the tool as a whole moves forward and the other while it moves backward. If with an ordinary tool having a single cutting face, the feed is .003" for each cut, then with my improved construction each tool may be fed forward .005", thereby gaining .002" per cut, meaning by a "cut" a forward and a backward stroke of the tool. I have given these figures merely as illustrations, but it is to be understood that different conditions as to stock, depth of cut, etc., will change them. The edges of the cutters are located as nearly central of the shank as possible, sufficient space between cutters or inclination to the cutting edges being provided so that the chips will clear themselves.

Since only one cutter is active at a time, means are provided for withdrawing one cutting face from the work or rendering it inoperative while the other is operative. The said means is preferably automatic in its action, and in the present illustration partakes of the nature of a walking-beam, first moving one cutter into the operative position and then the other. This feature of the invention can be carried out in a variety of ways; as an illustration I have shown the cutters arranged to engage with the walking-beam, and movement is imparted to the beam by the cutters themselves. When the shank is moved forward or back as the case may be, the idle cutter, having a well rounded wheel, strikes the work and is moved longitudinally; this longitudinal movement of the idle cutter through the medium of the beam causes the other cutter to be depressed, which brings it into engagement with the work. The under side of the idle cutter, being in engagement with the work at all times, holds the active cutter in the proper position.

From the foregoing it will be seen that the essential requirement of the cutter-operating device is that it be able to move one cutter into engagement with the work while the other cutter is moved away from it. The cutters may be attached to the beam or separate therefrom, depending upon the construction employed.

The tool as a whole is fed forward by suitable feeding mechanism on the bucket-cutting machine, and the amount of the feed will depend upon the depth of the cut and also on the character of the stock being cut.

Where it is desirable to cut only on the forward strokes, instead of on the forward and reverse, the edges of the cutters may be similarly placed, in which case the walking beam would no longer function as such, but would act as a stationary abutment for the cutters. In this case as before the end of the shank should extend very close to the edges of the cutters, since by so doing the cutters themselves may be made relatively small and of simple construction.

In the accompanying drawing, which illustrates one embodiment of my invention, Figure 1 is a side view of the tool; Fig. 2 is a longitudinal section thereof; Fig. 3 is an end view of the tool looking at the cutters; Fig. 4 is a cross-section; Fig. 5 is a view of the tool just before the idle or front cutter strikes the work; Fig. 6 is a similar view showing the idle or front cutter in engagement with the work, and the active or rear cutter in position to cut; Fig. 7 is a view showing the tool just before it starts on the return stroke; Fig. 8 is a view showing the idle or rear cutter in engagement with the work and the active or front cutter in position to cut the stock; and Fig. 9 is a view showing a modified arrangement of the cutters.

1 represents the shank of the tool which, when viewed in cross-section, has a greater length than width measured in the direction of the cut, and gradually tapers from the central portion toward both ends. This feature is clearly shown in Figs. 3 and 4. One surface of the shank is convex, as shown at 2, while the other principal surface 3 is straight, or substantially so. The surface 2 corresponds more or less closely to the curved wall of the bucket, while the surface 3 is so shaped that the tool as a whole can be swung around the center on which the bucket is formed, as shown in Fig. 3. The shank is provided with two sockets 4 which are located on opposite sides, each socket being open on one side so that the cutters can be arranged flush with the sides of the shank, and also to permit the insertion of a suitable means at the inner ends of the cutters to remove the latter. The walls of the socket are made angular to receive similar surfaces on the cutters 5 and 6. These cutters make a snug fit with the sockets and are prevented from turning by their angular faces.

In order to prevent the cutters from moving laterally out of their sockets the latter are slightly dovetail, as shown in Fig. 3, and the cutters are correspondingly shaped. In looking at the figure it will be seen that the cutting edges of the cutters slightly overlay the adjacent walls of the sockets and are arranged at a slight angle thereto, the said walls being thus shown partly in full lines and partly in dotted lines. The outer face of the cutter 6 is curved on the same radius as the surface 2 of the shank to be flush therewith, while the outer surface of the cutter 5 is made straight, or substantially so, to be flush with the surface 3.

To the cutters are secured rods 7 and 8, which engage with the beam or rocker 9 that is pivotally mounted in one end of the shank. The beam is held in place by a small plate 10 that extends across the opening 11 through which the beam is inserted in place. The cutters being disposed on opposite sides of the shank causes the rods 7 and 8 to be displaced from a central plane, as shown in Fig. 4, and the beam or rocker 9 is of such width that it will engage both of them.

12 represents the tool holder and 13 the wheel blank or work being cut by the tool and 14 the buckets.

As the tool moves on its forward stroke or in the direction of the arrow (Fig. 5), the curved surface of the front cutter 5 will engage with the work and be moved longitudinally in a vertical direction and will rock the beam or rocker 9. This motion of the beam 9 forces the rear cutter 6 downward into the position shown in Fig. 6, and said cutter is held in this position by reason of the fact that the under side of the cutter 5 is engaging with and is moving across the bottom of the slot being cut. It is also held in position by reason of the frictional engagement between the body of the cutter and the wall of the socket, such engagement being due to the direction of application of the driving force which is transverse to the socket and the cutter. In this figure, as well as in Figs. 7 and 8, the extent of movement of the tools has been somewhat exaggerated for the purpose of illustration.

Referring to Fig. 7, it will be seen that the cutter 6, which has been active, is now inactive, and as the tool is moved rearwardly in the direction of the arrow, the curved heel of cutter 6 striking the work moves it longitudinally in a vertical direction, which depresses the front cutter 5, as shown in Fig. 8, and the cutters retain this relation until after the cutter 5 passes off from the work.

In Fig. 9 is shown a slightly different arrangement of the cutters. It is important that the sharpened edges of the cutters be centrally located with respect to the front and rear edges of the shank to prevent chattering and dragging due to the turning of the shank about its axis when operatively mounted in the bucket-cutting machine. This location of the cutting edges is also necessary in order that the slots can be cut in the proper shape. Owing to the fact that the cutters have to overlap slightly in order to remove all of the metal between the buckets, both cutting edges cannot occupy the same central plane throughout their length, but the effect of this arrangement can be obtained by so placing the cutters that some portion of each coincides with the central transverse plane of the shank. It will be seen that the outer ends or corners 15 of the cutting edges coincide with the central plane of the shank. The edges are inclined backward from said plane by an amount sufficient to cause the chips to clear. With this arrangement all dragging and chattering of the cutters is prevented, either on the forward or reverse stroke.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by any other means.

What I claim as new and desire to secure by Letters Patent of the United States, is,

1. A slotting tool, comprising a shank, cutters extending from one end face thereof and having their cutting edges facing each other, one cutter being located at the rear of the center of said end face and adapted to cut during the forward stroke and the other cutter being located at the front of the center and adapted to cut during the rearward stroke, and means for advancing one cutter to an operative position while the other is being retracted.

2. In a tool for cutting curved slots across the peripheral face of a disk, ring or segment thereof, the combination of a shank having in cross-section a greater length than width and tapering toward the front and rear and provided with sockets, each socket having an open side, with cutters movably mounted in the sockets, which are flushed with and partake of the same shape as the outer surfaces of the shank, and means operatively related to the cutters for moving them alternately into and out of their cutting positions.

3. In a tool for cutting curved slots across the peripheral face of a disk, ring or segment thereof, the combination of a socketed shank having in cross-section a greater length than width and tapering toward the front and rear, cutters mounted in the sockets with their cutting edges facing each other, and means for moving first one cutter into engagement with the work and then another.

4. A slotting tool, comprising a shank provided with longitudinal sockets, cutters facing each other and mounted in the sockets for lengthwise movement therein and extending outwardly from an end face of the shank, and a member in the shank which is oscillated first by one cutter and then by the other to impart movement to the cutters alternately, the cutters being arranged one in front of the other so that at the beginning of each stroke the first cutter engages with the work and is moved inwardly thereby and operates through the said member to move the other cutter outwardly into its cutting position.

5. In a tool for cutting slots by successive cuts, the combination of a socketed shank, cutters oppositely mounted therein, and means arranged in the shank which is under the control of one cutter for moving another cutter into operative relation to the work.

6. A tool for cutting slots by successive cuts, comprising a shank having sockets therein, oppositely facing cutters mounted in the sockets and movable longitudinally and independently of the shank, and a rocker within the shank which engages both cutters and transmits longitudinal movement of one to the other.

7. A tool for cutting slots by successive cuts, comprising a shank having sockets therein, oppositely facing cutters mounted in the sockets and movable longitudinally and independently of the shank, a means for preventing the cutters from turning within the sockets, and a pivoted means located within the shank and engaging both cutters so that as one cutter is moved into its socket the other cutter is moved out of its socket a corresponding amount.

8. In a tool for cutting slots across the peripheral face of a disk, ring or segment thereof, the combination of a shank with overlapping cutters supported by the shank, which are arranged with their cutting edges facing each other and so positioned that some portion of each coincides with the same transverse plane.

9. The combination of a shank, and cutters mounted thereon which are arranged with their cutting edges adjacent to and facing each other and separated by a clearance space to permit the chips to pass.

10. The combination of a shank, and cutters mounted thereon which are arranged with their cutting edges disposed parallel and facing each other and separated by a clearance space to permit the chips to escape.

11. The combination of a shank, and cutters mounted thereon which are arranged with their cutting edges parallel and facing each other with a clearance space between them through which the chips pass and extending substantially transversely to the direction of the cutting stroke.

12. The combination of a shank having a greater length than width in cross-section, and tapering toward the edges, and cutters mounted on the shank whose cutting edges are presented toward each other with a clearance separating them and disposed in the general direction of the width of the shank and are each of a length less than said width and arranged to overlap each other.

In witness whereof, I have hereunto set my hand this 16th day of January, 1904.

JOHN RIDDELL.

Witnesses:
BENJAMIN B. HULL,
HELEN ORFORD.